(12) United States Patent
Poindexter (10) Patent No.: US 10,336,627 B2
(45) Date of Patent: Jul. 2, 2019

(54) INFUSION APPARATUS (71) Applicant: Helen of Troy Limited, St. Michael (BB)

(72) Inventor: Michael Poindexter, New York, NY (US)

(73) Assignee: Helen of Troy Limited, St. Michael (BB)

( * ) Notice: Subject to any disclaimer, the term of this patent is extended or adjusted under 35 U.S.C. 154(b) by 16 days.

(21) Appl. No.: 15/476,588

(22) Filed: Mar. 31, 2017

(65) Prior Publication Data

US 2018/0282178 A1    Oct. 4, 2018

(51) Int. Cl.
| C02F 1/00 | (2006.01) |
| C02F 1/68 | (2006.01) |
| A47J 31/18 | (2006.01) |
| A47J 31/60 | (2006.01) |
| A47J 31/06 | (2006.01) |

(52) U.S. Cl.
CPC ............... *C02F 1/003* (2013.01); *A47J 31/18* (2013.01); *A47J 31/605* (2013.01); *C02F 1/68* (2013.01); *A47J 31/0636* (2013.01); *C02F 2201/006* (2013.01); *C02F 2307/04* (2013.01)

(58) Field of Classification Search
CPC ...... C02F 1/003; C02F 1/68; C02F 2201/006; C02F 2307/04; A47J 31/0636
USPC ................. 210/464, 470, 473, 477, 479, 482
See application file for complete search history.

(56) References Cited

U.S. PATENT DOCUMENTS

| 5,318,791 | A | 6/1994 | Millman et al. |
| 5,325,996 | A | 7/1994 | Bannigan |
| 5,922,378 | A | 7/1999 | Kagan et al. |
| 7,585,409 | B2 | 9/2009 | Bommi et al. |
| 7,670,479 | B2 | 3/2010 | Arett et al. |
| 8,097,159 | B1 | 1/2012 | Peng |
| 8,128,820 | B2 | 3/2012 | Wu |
| 8,541,039 | B2 | 9/2013 | Lackey et al. |
| 2005/0252844 | A1 | 11/2005 | Chau |
| 2011/0300275 | A1* | 12/2011 | Lackey ................... C02F 1/003 426/431 |
| 2012/0148707 | A1 | 6/2012 | Lackey et al. |
| 2013/0139701 | A1* | 6/2013 | Marconi ............ A47J 27/21183 99/296 |
| 2016/0136545 | A1* | 5/2016 | Takeda ................. B01D 27/146 210/232 |

FOREIGN PATENT DOCUMENTS

WO    WO-2015175630 A1 * 11/2015    .............. A47J 31/02

* cited by examiner

*Primary Examiner* — Madeline Gonzalez
(74) *Attorney, Agent, or Firm* — Ulmer & Berne LLP (57) ABSTRACT

A water filter and infusion pitcher apparatus includes a pitcher housing, a water filter disposed within the pitcher housing, and an infusion apparatus disposed inside the pitcher housing and detachably connected to the water filter. The infusion apparatus constructed to contain and/or hold material such as, for example fruit, vegetables, tea, medicines, flavorings, vitamins, minerals, and/or other items to infuse, seep, and/or dissolve into a liquid within the pitcher housing.

20 Claims, 7 Drawing Sheets

INFUSION APPARATUS

DESCRIPTION OF DRAWINGS

The embodiments set forth in the drawings are illustrative in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The following text sets forth a broad description of numerous different embodiments. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims.

It should also be understood that, unless a term is expressly defined in this specification using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential unless so stated. To the extent that any term recited in the claims at the end of this patent is referred to in this patent in a manner consistent with a single meaning, that is done for sake of clarity only so as to not confuse the reader, and it is not intended that such a claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Referring to FIGS. 1-4, an embodiment of a water filter and infusion pitcher apparatus (hereinafter, "Pitcher Apparatus") is shown as 10. Pitcher Apparatus 10 includes a pitcher housing 12, an unfiltered water pour tray 20, a water filter 40 disposed within the pitcher housing 12, and an infusion apparatus (hereinafter, "infuser") 50 disposed inside of the pitcher housing 12 and detachably connected to the water filter 40. The pitcher housing 12 includes an exterior wall 14, a closed end 15, a filtered water reservoir 18 formed by the exterior wall 14 and closed end 15, and an open end 16 disposed opposite the closed end and in communication with the reservoir 18. The pitcher housing 12 may also include a handle 17. In addition, the pitcher housing 12 may include a lid 19 that is detachably connected to the pitcher housing 12 at the open end 16. It is understood that any conventional and/or yet-to-be developed water pitcher configurations may be combined with the infuser 50 to form the water filter and infusion pitcher apparatus. It is also understood that the infuser 50 may be used with other water devices and/or filtering devices.

Figure 1:
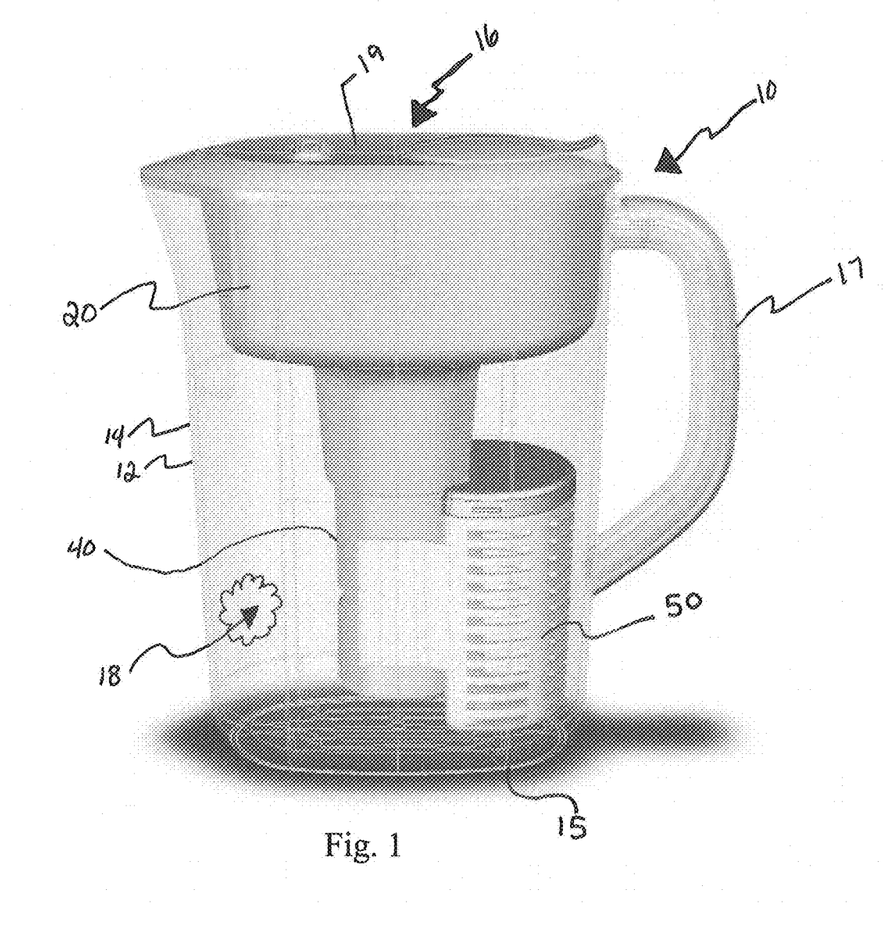
FIG. 1 is a side isometric view of an embodiment of a water filter and infusion pitcher apparatus according to one or more embodiments.
Figure 2:
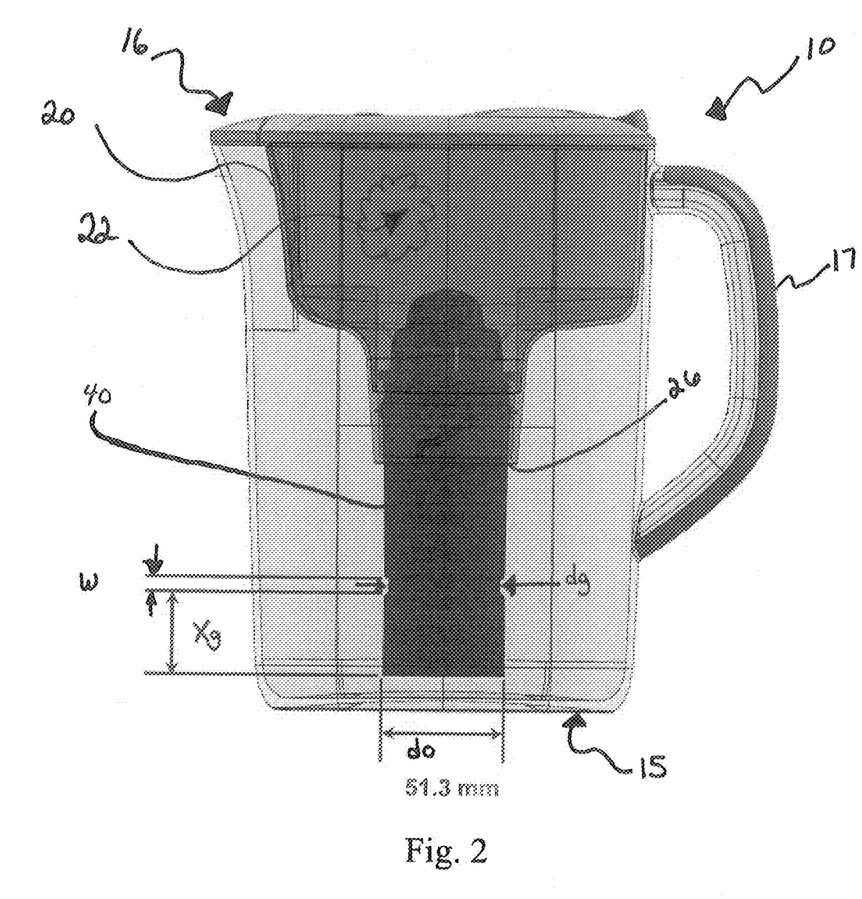
FIG. 2 is a side elevational view of the water filter and infusion pitcher apparatus of FIG. 1, wherein the infuser is removed.

The unfiltered water pour tray 20 may be constructed and sized to fit within the open end 16 and rest within the reservoir 18. In some embodiments, the unfiltered water pour tray 20 includes an unfiltered water reservoir 22 that is formed by and within the unfiltered water pour tray 20. In some embodiments, the reservoir 22 is constructed to receive and hold unfiltered water therein. In some embodiments, the unfiltered water pour tray 20 includes a flanged end or lip (not shown) as conventionally known which rests upon an upper edge (not shown) of the pitcher housing 12 and supports the unfiltered water pour tray 20 within the pitcher housing 12. When the unfiltered water pour tray 20 is inserted into the open end 16 of the pitcher housing 12, the lip rests upon the upper edge of the pitcher housing 12. The unfiltered water pour tray 20 also includes an opening 26 disposed through its bottom wall 28. The opening 26 is constructed to receive and hold a water filter 40. As shown, the opening is constructed to permit the water filter 40 to slide at least partially through it. In some embodiments, the filter 40 may be a conventional or yet-to-be developed water filter cartridge.

In some embodiments, the filter is a filter cartridge having an outer diameter ($d_O$) from about 30 mm to about 70 mm, in some embodiments from about 40 mm to about 60 mm, in some embodiments from about 50 mm to about 55 mm, and/or in some embodiments about 51 mm as shown in FIG. 2. In some embodiments, the filter cartridge 40 may include a groove 44 that is disposed into an outer housing 42 of the filter cartridge 40. The filter groove 44 may extend partially about the circumference of the filter cartridge 40 or completely about the circumference of the filter cartridge. In some embodiments, the groove 44 may actually be two separate grooves (not shown) disposed within opposite sides of the filter cartridge 40. In some embodiments, the filter cartridge 40 may include one or more detents (not shown) disposed in the side of the cartridge, instead of the groove, constructed to receive one or more corresponding protrusions extending from the infuser as will be described herein below. Alternatively, the filter cartridge 40 may include one or more protrusions (not shown) disposed in the side of the cartridge, instead of the groove or detents, constructed to receive one or more corresponding detents disposed upon the infuser as will be described herein below.

Still referring to FIG. 2, the groove 44 may have a groove diameter ($d_g$) from about 30 mm to about 70 mm, in some embodiments from about 40 mm to about 60 mm, in some embodiments from about 40 mm to about 50 mm, from about 45 mm to about 48 mm, and/or in some embodiments about 47 mm. In some embodiments, the groove diameter ($d_g$) is about 7 mm less than the outer diameter ($d_O$). In some embodiments, the groove diameter ($d_g$) is about 4 mm less than the outer diameter ($d_O$). In some embodiments, the groove diameter ($d_g$) is from about 0.5 mm to about 5 mm. In some embodiments, the groove 44 may have a width (W) from about 0.5 mm to about 15 mm, in some embodiments from about 3 mm to about 10 mm, or in some embodiments from about 5 mm to about 6 mm. The groove 44 may be disposed anywhere along the length of the filter cartridge 40. In some embodiments, the groove 44 is disposed a distance ($X_g$) from the bottom of the filter cartridge 40, wherein the distance ($X_g$) may range from about 25 mm to about 45 mm, in some embodiments from about 30 mm to about 40 mm, or in some embodiments about 36 mm. In one specific example, the distance ($X_g$) is 35.6 mm, the groove width (W) is 5.5 mm, and the groove diameter ($d_g$) of 47.1 mm.

Figures 3, 4:
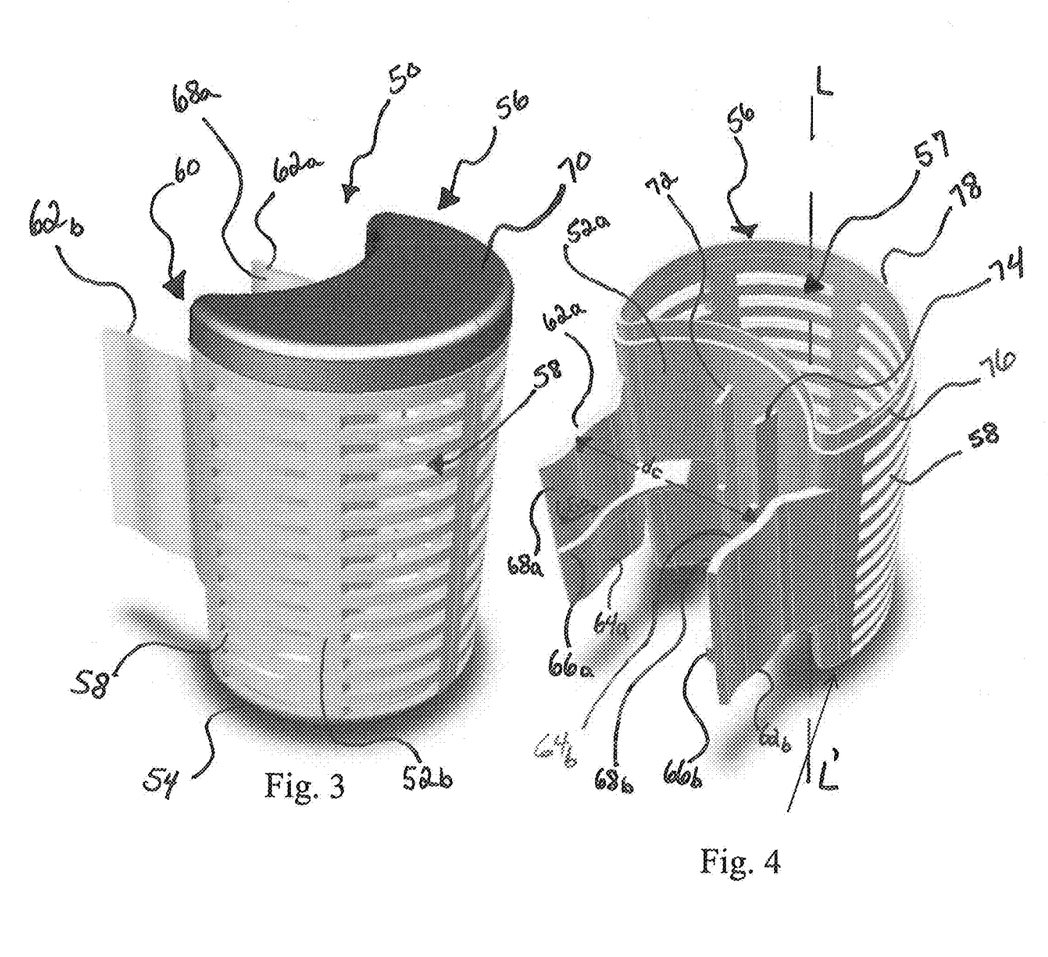
FIG. 3 is a front isometric view of an embodiment of an infuser of the water filter and infusion pitcher apparatus of FIG. 1.
FIG. 4 is a back isometric view of the infuser of FIG. 3.

Referring to FIGS. 3 and 4, the infuser 50 includes a first wall 52a, a second wall 52b, a bottom wall 54, an infuser reservoir 57 formed by and/or within the first, second and bottom walls, and a clip 60 extending from the first wall 52a and constructed to connect the infuser 50 to the filter cartridge 40. In this embodiment, the first wall 52a, second wall 52b, and/or the bottom wall 54 are optionally integrally formed as a single component. In some embodiments, the first, second, and bottom walls are separate and distinct components that are connected to each other using conventional connection methods such as, for example, welds, press seal, snap-fit connections, screws, or the like.

The first and second walls may include one or more apertures disposed therethrough to permit water to pass from outside the infuser 50 through the walls and into the infuser reservoir. As shown in FIGS. 1, 3, and 4, the second wall 52b includes a plurality of apertures 58 disposed therethrough, permitting water passage from outside the infuser to inside the infuser reservoir 57. The number, shape and configuration of the apertures 58 may varying as desired or in order to provide sufficient water permeation to allow objects contained within the infuser reservoir 57 to seep or infuse into the filtered water contained within the pitcher reservoir 18. In some embodiments, such as the one shown in FIGS. 1, 3, and 4, the apertures 58 are rectangular-shaped.

The infuser 50, in this embodiment, has a cross sectional shape that is crescent-shaped. In other words, the infuser 50 includes the first wall 52a (e.g., an inner wall) and the second wall 52b (e.g., an outer wall) which each convexly curve in the same direction to form a substantially crescent-shape. The curved walls 52a and 52b do not have the same radius of curvature; however, in some embodiments, the walls do have the same radius of curvature and/or may be parallel to one another. However, it is understood that the infuser, its walls, and other components may have any number of various configurations, shapes, and/or sizes.

In some embodiments, the clip 60 is a spring clip that includes at least a portion that has a diameter ($d_C$) that is slightly smaller than the diameter of the filter cartridge 40 such as, for example, ($d_O$) and/or ($d_g$), such that this portion of the spring clip resiliently expands to encompass the outer wall and/or groove of the filter cartridge therein and then contracts about the outer wall and/or groove of the filter cartridge to frictionally engage the outer wall.

Still referring to FIGS. 1-4, one embodiment of the clip 60 includes a first clip member 62a that extends away from the first wall 52a and a second clip member 62b that extends away from the first wall 52a, opposite the first clip member 62a. The first and second clip members 62a and 62b include a first concave portion 64a and a second concave portion 64b, respectively, wherein the first and second concave portions are opposite each other and are constructed to approximate the curvature of the outer wall of the filter cartridge 40. In this embodiment, the diameter ($d_C$) between the first and second concave portions is equal to or less than the outer diameter ($d_O$) of the filter cartridge 40.

In the embodiment shown, a first rib 66a extends from an inner surface 65a of the first clip member 62a. In some embodiments, this rib 66a extends radially inwardly from the inner surface 65a of the first clip member 62a. Also, in the embodiment shown, a second rib 66b extends from an inner surface 65b. In some embodiments, the rib 66b extends radially inwardly from the inner surface 65b. The first and second ribs 66a and 66b, respectively, may run along a portion or all of the respective first and second clip members 62a and 62b. In some embodiments, such as the one shown in FIG. 4, the first and second ribs 66a and 66b, respectively, may form a concave curve similar to or the same as the curve of the first and second concave portions 64a and 64b, respectively. In some embodiments, the first and second ribs 66a and 66b, respectively, are constructed to insert into and engage the groove 44 of the filter cartridge 40. In some embodiments, the spring action of the first and second clip members 62a and 62b, respectively, cause or force the first and second ribs 66a and 66b, respectively, into a respective portion of the groove and/or grooves.

The first wall 52a may include a first wall extender 72 and a second wall extender 74, each of which extends outwardly from the first wall. In some embodiments, the first and second wall extenders 72 and 74, respectively, extend from the first wall 52a at a direction transverse to a longitudinal axis L-L' of the infuser 50.

Figure 5:
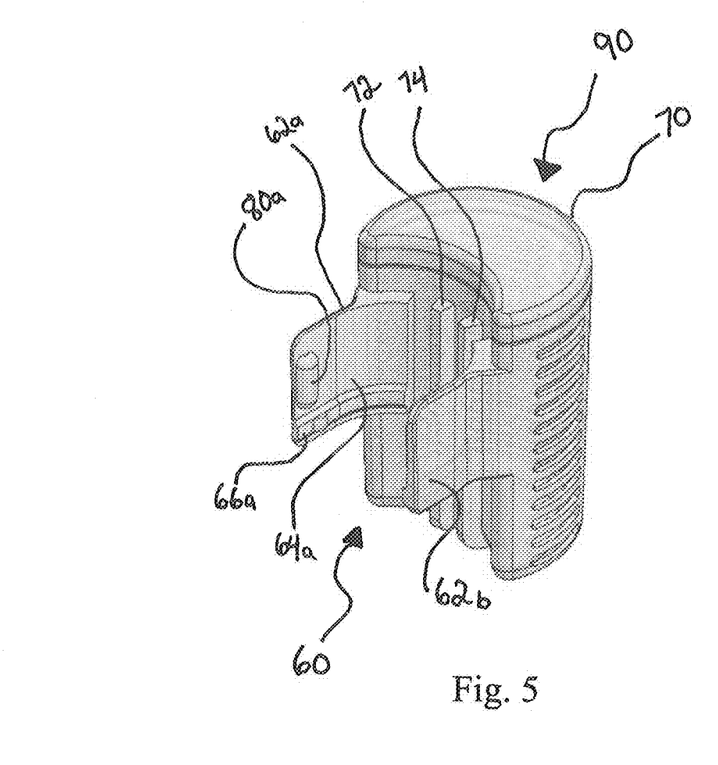
FIG. 5 is a back isometric view of another embodiment of an infuser that may be used with the water filter pitcher of FIG. 2 according to one or more embodiments.
Figure 6:
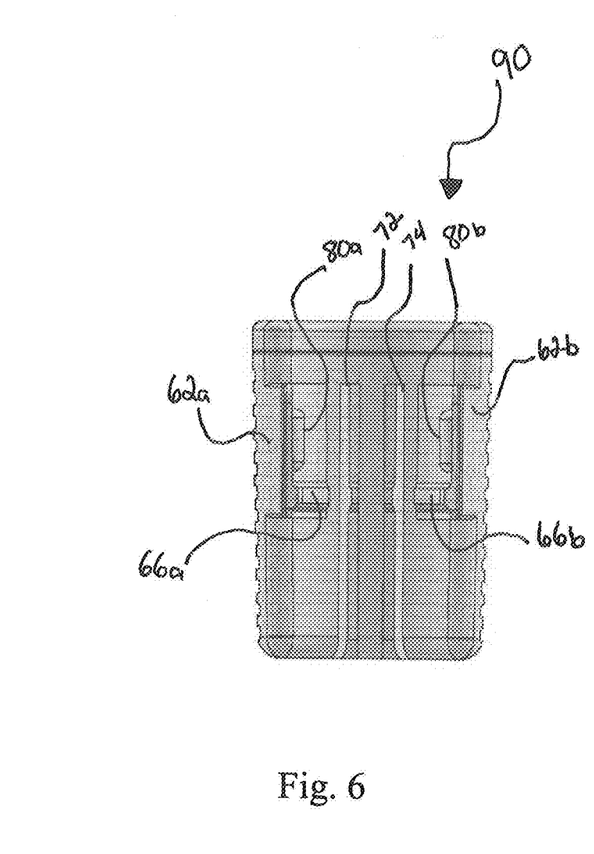
FIG. 6 is a back side elevational view of the infuser of FIG. 5.

A first clip stop 68a which may be a convex surface that extends radially inwardly and a second clip stop 68b which may be a convex surface that extends radially inwardly as shown in FIG. 4. In some embodiments the first and second clip stops may be a protrusion as shown in the alternative infuser embodiment 90 as 80a and 80b, respectively, shown in FIGS. 5-6. This infuser 90 may connect and/or clip onto the filter cartridge 40 similar to or the same as the infuser 50 described above herein. In particular, the first rib 66a and second rib 66b insert into and/or engage the groove 44 of the filter cartridge such that the clip 60, i.e., first and second clip members 62a and 62b, respectively, engage the filter cartridge as shown and described above herein.

Referring back to FIGS. 3 and 4, the first and second clip stops 68a and 68b, respectively, are positioned along the respective first and second clip members 62a and 62b, respectively, opposite one another and constructed such that the first and second clip stops 68a and 68b, respectively, engage the outer wall of the filter cartridge and force and/or hold the filter cartridge against the first and second wall extenders 72 and 74, respectively. The first and second clip stops 68a and 68b, respectively, may be positioned along the respective first and second clip members 62a and 62b a linear distance from the respective first and second wall extenders 72 and 74 that is equal to or greater than a radius of the outer wall of the filter cartridge.

In some embodiments, the infuser 50 or 90 may include an infuser lid 70 detachably connected to the infuser 50 at the open end 56. In the embodiment shown, the second wall 52b includes one or more tabs 76 extending away from the first and/or second walls 52a and/or 52b, respectively, disposed about an upper edge 78 of the second wall, adjacent to the open end 56. Correspondingly, the lid 70 includes respective detents (not shown) constructed to receive the one or more tabs 76 and detachably hold the lid 70 to the infuser 50. In some embodiments, an inside surface of the lid 70 may snap-over the tabs 76. In some embodiments, the edge 78 may include one or more detents (not shown) constructed to receive the tabs 70. In some embodiments, the tabs (not shown) are positioned upon the inside surface of the lid 70 and the detents (not shown) are positions on the upper edge 78 of the infuser. In some embodiments, the lid 70 may include a living hinge that connects the lid to the infuser 50, snap-fit connections, combinations thereof, or any other various known or yet-to-be developed connection mechanisms.

Figures 7, 8:
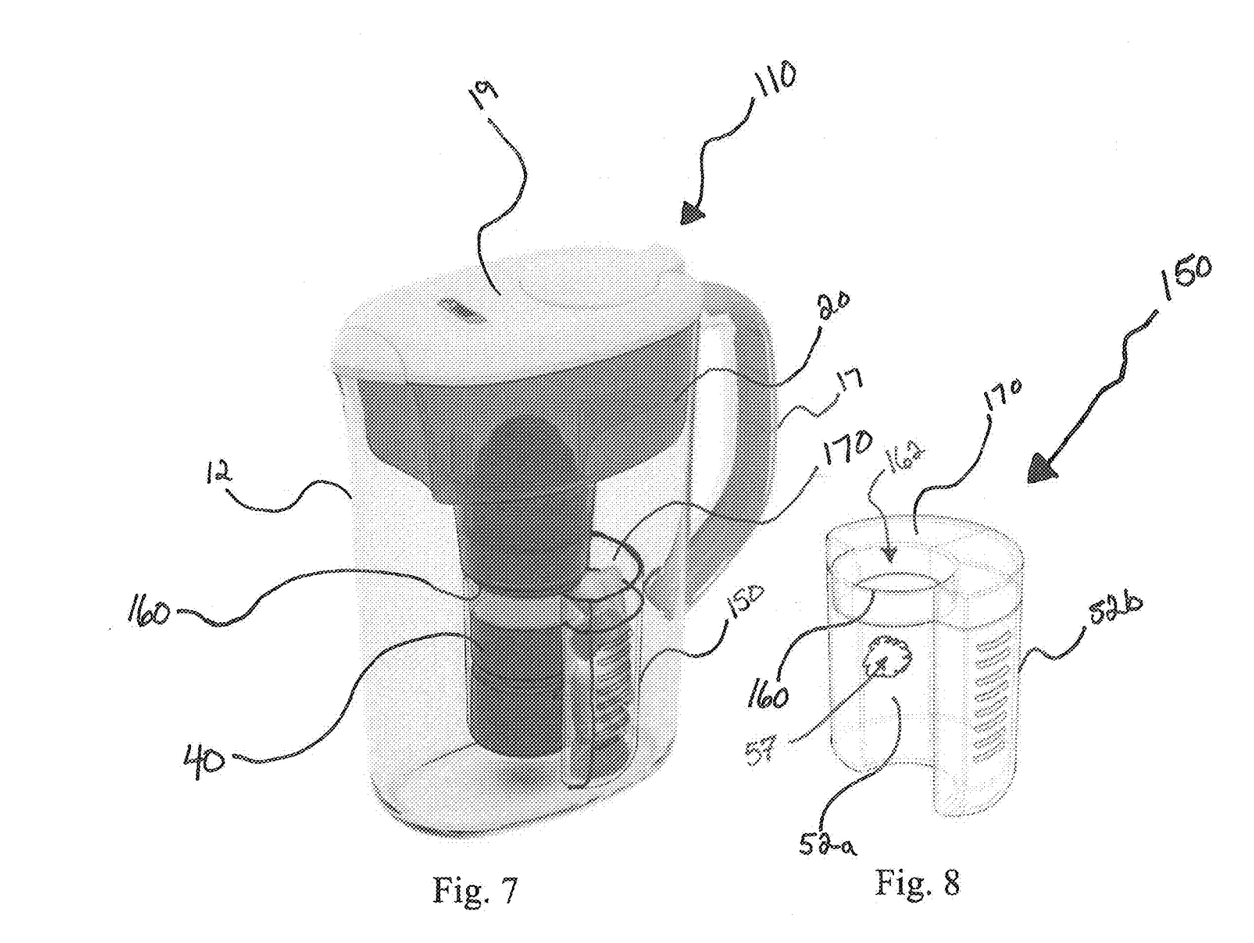
FIG. 7 is a front isometric view of another embodiment of a water filter and infusion pitcher apparatus according to one or more embodiments.
FIG. 8 is a back isometric view of the infuser of FIG. 7.

Referring to FIGS. 7-8, another embodiment of the water filter and infusion pitcher apparatus 110 is shown (hereinafter, "Pitcher Apparatus"). Pitcher Apparatus 110 may include all or some of the same components as the pitcher housing 12 shown and described above herein. The pitcher Apparatus 110 includes an infuser 150 that includes a first wall 52a, a second wall 52b, a bottom wall 54, an infuser reservoir 57 formed by and/or within the first, second and bottom walls, a lid 170, and a filter cartridge receiver 160 that includes forms an aperture 162. In some embodiments, the filter cartridge receiver 160 is integral to and part of the lid 170. In some embodiments, the filter cartridge receiver 160 is a separate and distinct component from the lid 170 that may or may not be connectable to the lid 170. In some embodiments, the filter cartridge receiver 160 extends from the infuser 150 such as, for example, from an upper portion of the first wall 52a. In some embodiments, the filter cartridge receiver 160 is integral to the infuser. In some embodiments, the filter cartridge receiver 160 is a separate component from and connected and/or fixedly attached to the infuser. In any of these illustrative embodiments, the filter cartridge receiver 160 is constructed to receive a lower portion of the filter cartridge 40 and allow such lower portion to pass through the receiver 162. The filter cartridge 40 may have an upper portion that includes a larger diameter than the lower portion or extending tabs (not shown) protruding from its outer circumference that permit the filter cartridge 40 to rest upon and thus not pass through the aperture 162. As such, the filter cartridge receiver aperture 162 holds and detachably connects the infuser 150 to the filter cartridge 40. In some embodiments, an inner surface (not shown) of the aperture 160 may protrude radially inwardly such that the protruding inward surface may snap into the groove 44 or some other groove or channel disposed on the filter cartridge 40.

In this embodiment, the first wall 52a and second wall 52b are optionally integrally formed as a single component. In some embodiments, the first and second walls are separate and distinct components that are connected to each other using conventional connection methods such as, for example, welds, press seal, snap-fit connections, screws, or the like. The first and second walls may include one or more apertures disposed therethrough to permit water to pass from outside the infuser 50 through the walls and into the infuser reservoir. As shown in FIGS. 7-8, the second wall 52b includes a plurality of apertures 58 disposed therethrough, permitting water passage from outside the infuser to inside the infuser reservoir 57. The number, shape and configuration of the apertures 58 may varying as desired or in order to provide sufficient water permeation to allow objects contained within the infuser reservoir 57 to seep or infuse into the filtered water contained within the pitcher reservoir 18. In some embodiments, such as the one shown in FIGS. 1, 3, and 4, the apertures 58 are rectangular-shaped. In some embodiments, such as the one shown in FIGS. 5-9, the apertures 58 are rectangular-shaped with rounded ends.

The infuser 50, in this embodiment, has a cross sectional shape that is crescent-shaped. In other words, the infuser 50 includes the first wall 52a (e.g., an inner wall) and the second wall 52b (e.g., an outer wall) which each convexly curve in the same direction to form a substantially crescent-shape. The curved walls 52a and 52b do not have the same radius of curvature; however, in some embodiments, the walls do have the same radius of curvature and/or may be parallel to one another. However, it is understood that the infuser, its walls, and other components may have any number of various configurations, shapes, and/or sizes.

Figure 9:
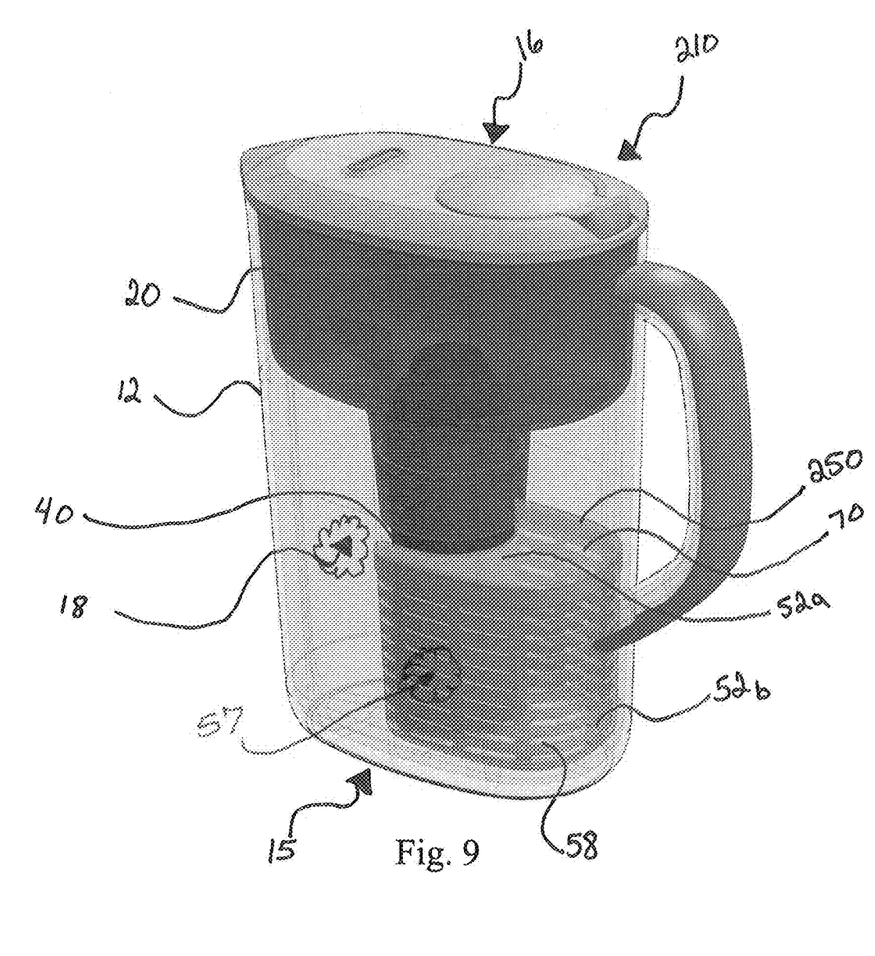
FIG. 9 is a back isometric view of another embodiment of a water filter and infusion pitcher apparatus according to one or more embodiments.

Referring to FIG. 9, another embodiment of the water filter and infusion pitcher apparatus 210 is shown (hereinafter, "Pitcher Apparatus"). Pitcher Apparatus 210 may include all or some of the same components as the pitcher housing 12 shown and described above herein. The pitcher Apparatus 210 includes an infuser 250 that includes a first wall 52a, a second wall 52b, a bottom wall 54, and an infuser reservoir 57 formed by and/or within the first, second and bottom walls, a lid 70.

In this embodiment, the first wall 52a and second wall 52b are optionally integrally formed as a single component. In some embodiments, the first and second walls are separate and distinct components that are connected to each other using conventional connection methods such as, for example, welds, press seal, snap-fit connections, screws, or the like. The first and second walls may include one or more apertures disposed therethrough to permit water to pass from outside the infuser 50 through the walls and into the infuser reservoir. As shown in FIG. 9, the second wall 52b includes a plurality of apertures 58 disposed therethrough, permitting water passage from outside the infuser to inside the infuser reservoir 57. The number, shape and configuration of the apertures 58 may varying as desired or in order to provide sufficient water permeation to allow objects contained within the infuser reservoir 57 to seep or infuse into the filtered water contained within the pitcher reservoir 18. In some embodiments, such as the one shown in FIGS. 1, 3, and 4, the apertures 58 are rectangular-shaped with rounded ends. However, similar to the other embodiments herein, the apertures may be any configuration, shape, and size.

The infuser 50, in this embodiment, has a cross sectional shape that is crescent-shaped. In other words, the infuser 50 includes the first wall 52a (e.g., an inner wall) and the second wall 52b (e.g., an outer wall) which each convexly curve in the same direction to form a substantially crescent-shape. The curved walls 52a and 52b do not have the same radius of curvature; however, in some embodiments, the walls do have the same radius of curvature and/or may be parallel to one another. However, it is understood that the infuser, its walls, and other components may have any number of various configurations, shapes, and/or sizes.

In this embodiment, the first wall 52a forms a clip member. In some embodiments, the first wall 52a may have a shape or curvature that approximates at least a portion of the shape and/or curvature of the filter cartridge 40 to provide a close tolerance engagement between a portion of the outer wall of the filter cartridge 40 and first wall 52a of the infuser. In some embodiments, the first wall 52a has some resiliency or spring force such that the infuser snaps onto and off of the filter cartridge. In some embodiments, the first wall 52a includes a diameter ($d_C$) that is equal to or less than the outer diameter ($d_O$) of the filter cartridge 40. In some embodiments, the first wall 52a may include a rib (not shown, but similar to first rib 66a and/or second rib 66b) that extends outwardly (e.g., radially) from an inner surface of the first wall 52a. This rib may be constructed to insert into and engage the channel 44 of the filter cartridge 40 in order to attach and/or hold the infuser to the filter cartridge. The first wall 52a may also include other similar or the same components as found in the other embodiments shown and described above herein such as, for example, the first wall extender 72, second wall extender 74, first clip stop 68a, and/or second clip stop 68b. In addition, the infuser 250 may include an infuser lid 270 that is the same as or similar to the infuser lid 70 set forth above herein, including the mechanisms to attach the lid 70 to the infuser 50.

Figure 10:
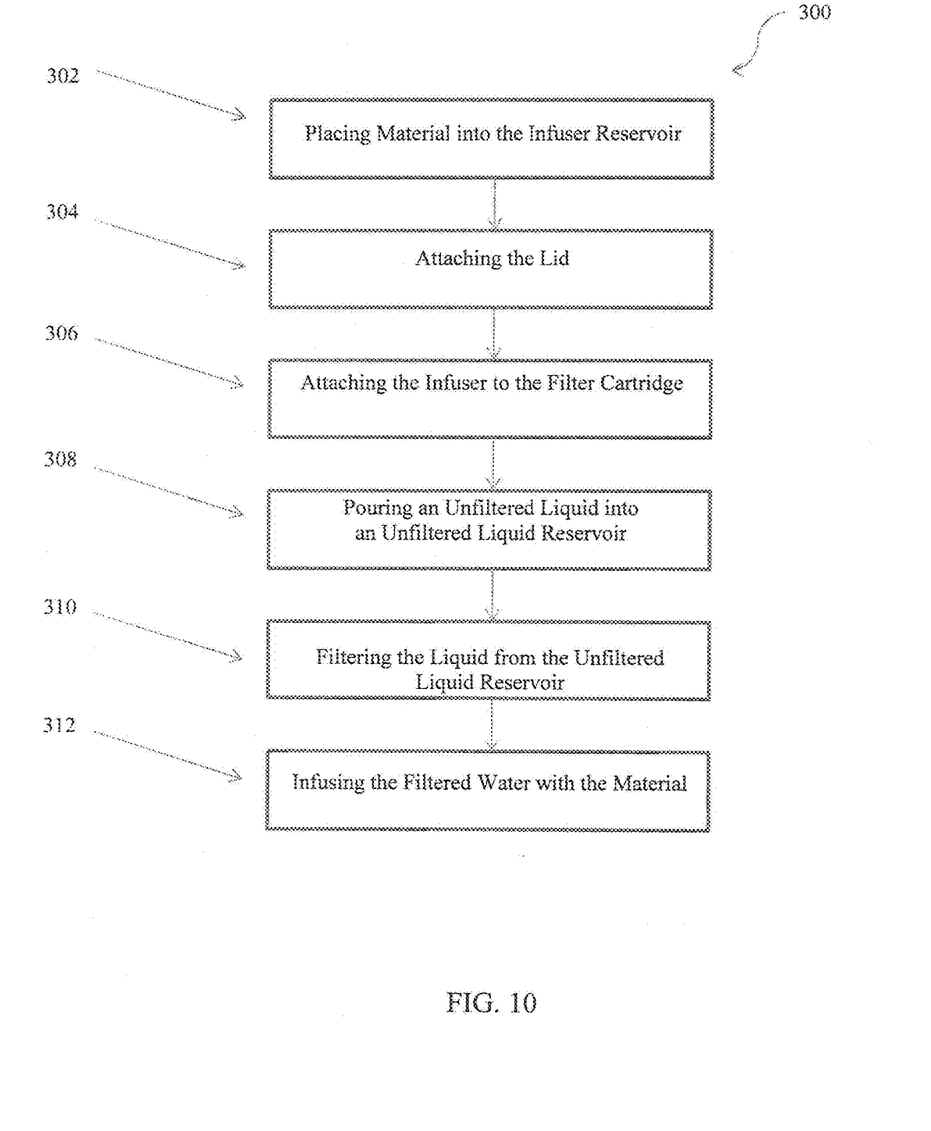
FIG. 10 is a schematic representation of a method of infusing a filtered liquid.

In some embodiments, the infuser (e.g., 50, 90, 150, 250) may be used to contain and/or hold material such as, for example, fruit, vegetables, tea, medicines, flavorings, vitamins, minerals, and/or other items in loose, bag, or other forms and then used to infuse, seep and/or dissolve into a liquid such as, for example, hot water to cause the materials and/or its flavors to seep and/or dissolve into the liquid. Referring to FIG. 10, as an example, a method 300 of infusing or seeping a material may comprise placing a material 302 (e.g., one or more pieces of fruit or one or more tea bags) into the infuser reservoir (e.g., 57), connecting the lid 304 (e.g., 50) upon the open end (e.g., 56), attaching the infuser 306 (e.g., 50) to the filter cartridge (e.g., 40), pouring an unfiltered liquid 308 such as, for example, water, into the unfiltered liquid reservoir (e.g., 22), filtering the liquid 310 (e.g., water) from the unfiltered liquid reservoir (e.g., 22) through the filter cartridge (e.g., 40) and into the filtered liquid reservoir (e.g., 18), and/or infusing or seeping the material 312 (e.g., fruit or tea bag(s)) into the filtered liquid (e.g., water). In some embodiments, the method of infusing or seeping may include or not include one or more of the above disclosed steps and these steps may be arranged in any order.

When the infuser (e.g., 50) filled with a material (e.g., fruit or tea bag(s)) is positioned within the filtered water reservoir (e.g., 18), it may contain filtered water already or it may not contain any water. If it doesn't contain any water, then unfiltered water may be poured into the unfiltered water reservoir (e.g., 22) such that the unfiltered water travels through and is filtered by the filter cartridge (e.g., 40) into the filter water reservoir (e.g., 18). At which point, the tea within the tea bags contained within the infuser reservoir (e.g., 57) seep and/or dissolve into the filter water within the filtered water reservoir (e.g., 18).

It should be understood that any feature and/or element of any one of the embodiments and/or examples shown and described above herein may be removed from the embodiment and/or example, replaced with a feature or element from another embodiment or example herein or replaced with an equivalent feature or element.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or patent application, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made. It is therefore intended to cover in the appended claims all such changes and modifications.

The invention claimed is:

1. A water filter and infusion apparatus comprising:
   a housing including a reservoir;
   an unfiltered water pour tray disposed at least partially within the housing, the unfiltered water pour tray having a bottom wall and an opening disposed through the bottom wall;
   a filter cartridge, a portion of which extends partially through the opening and below the bottom wall of the pour tray; and
   an infuser having an infuser reservoir, a plurality of apertures disposed within the infuser, and a connector removably connecting the infuser to the filter cartridge.

2. The apparatus of claim 1, wherein the pour tray is disposed in an upper portion of the reservoir.

3. The apparatus of claim 1, the infuser includes a first side wall.

4. The apparatus of claim 3, wherein the connector comprises a clip extending from the first side wall.

5. The apparatus of claim 4, wherein the clip is a spring clip.

6. The apparatus of claim 4, wherein the clip comprises a first clip member extending from the first side wall and a second clip member extending from the first side wall and disposed opposite the first clip member.

7. The apparatus of claim 6, wherein the first and second clip members comprises respective first and second concave portions, each of the first and second concave portions constructed to frictionally engage an outer surface of the filter cartridge.

8. The apparatus of claim 7, wherein the clip comprises a diameter measured between the first concave portion and the second concave portion that is less than a diameter of an outer surface of the filter cartridge such that a portion of the clip expands to encompass the outer surface of the filter cartridge and then contracts about and frictionally engages the outer surface.

9. The apparatus of claim 8, wherein the filter cartridge includes a groove that the first and second clip members engage to removably connect the infuser to the filter cartridge.

10. The apparatus of claim 9, wherein the first and second clip members comprise a first rib and a second rib, respectively, to engage the groove of the filter cartridge.

11. The apparatus of claim 3, wherein a portion of the first side wall that is concavely-curved to form the connector such that this portion is correspondingly shaped to fit around a portion of the filter cartridge.

12. The apparatus of claim 8, wherein the first side wall comprises a material and is constructed such that the connector portion of the first side wall is resilient enough to expand around and then contract onto and frictionally engage an outer surface of the filter cartridge.

13. The apparatus of claim 3, further comprising a second side wall connected to the first side wall, wherein the plurality of apertures are disposed through the second side wall such that filtered liquid in the reservoir may pass through the apertures into the infuser reservoir.

14. The apparatus of claim 13, wherein the first and second side walls are integral to each other.

15. The apparatus of claim 14, wherein the first and second side walls are both convexly-curved in the same direction.

16. The apparatus of claim 3, wherein the connector comprises a filter cartridge receiver.

17. The apparatus of claim 16, wherein filter cartridge receiver comprises an aperture configured to receive the filter cartridge and removably connect the infuser to the filter cartridge.

18. A water filter and infusion kit comprising:
a pitcher including
   a housing including a reservoir and
   an unfiltered water pour tray disposed at least partially within the housing such that a portion of the reservoir below the unfiltered water pour tray forms a filtered water reservoir, the unfiltered water pour tray having a bottom wall and an opening disposed through the bottom wall;
a filter cartridge disposed partially through the opening such that a portion of the filter cartridge extends below the unfiltered water pour tray and into the filtered water reservoir; and
an infuser having a side wall, a plurality of apertures disposed in the side wall, an infuser reservoir at least partially formed by the side wall, and a connector;
wherein the connector is constructed to removably connect the infuser to the filter cartridge.

19. The kit of claim 18, wherein the connector comprises a first clip member extending from the side wall and a second clip member extending from the side wall and positioned opposite the first clip member, wherein the first and second clip members are constructed of a material and shape to form a spring clip for at least partially encompassing and engaging an outer surface of the filter cartridge.

20. A method of infusing a material using the kit of claim 18, the method comprising:
placing material into the infuser reservoir;
attaching the infuser to the filter cartridge;
placing the filter cartridge into the unfiltered water pour tray;
pouring an unfiltered liquid into the unfiltered water pour tray;
filtering the liquid from the unfiltered water pour tray to the filtered water reservoir; and
infusing the filtered liquid in the filtered water reservoir with the material.

* * * * *